United States Patent Office 3,576,817
Patented Apr. 27, 1971

3,576,817
PRODUCTION OF PEROXY COMPOUNDS
Brian Walton Harris, Horley, Surrey, England, assignor to BP Chemicals (U.K.) Limited, London, England
No Drawing. Filed May 8, 1968, Ser. No. 727,716
Claims priority, application Great Britain, May 25, 1967, 24,271/67
Int. Cl. C07d 85/26
U.S. Cl. 260—307
14 Claims

ABSTRACT OF THE DISCLOSURE

In the production of 1,1'-peroxydicyclohexylamine from dihydroxydicyclohexyl peroxide, or substances giving dihydroxydicyclohexyl peroxide under the reaction conditions, with ammonia, improved results are obtained by carrying out the reaction in the presence of ammonium chloride.

---

The present invention relates to a process for the production of 1,1'-peroxydicyclohexylamine.

1,1'-peroxydicyclohexylamine, herein after referred to as peroxyamine (I) and processes for its production and use an intermediate for producing resinous monomers are described in Belgian Patent 701,327. This patent describes a process for making peroxyamine (I) by reaction of 1,1'-dihydroxydicyclohexyl peroxide, hereinafter referred to as peroxide (II), or substances giving peroxide (II) under the reaction conditions, with ammonia. Thus peroxyamine (I) may be prepared by reaction of hydrogen peroxide, cyclohexanone and ammonia.

According to the present invention a process for producing 1,1'-peroxydicyclohexylamine comprises reacting 1,1'-dihydroxydicyclohexyl peroxide, or substances giving 1,1'-dihydroxydicyclohexyl peroxide under the reaction conditions, with ammonia in the presence of ammonium chloride.

Peroxide (II) and processes for its preparation are described in the literature, for example J.A.C.S., vol. 61, p. 2430, paper by N. A. Milas and co-workers. Examples of substances capable of giving rise to peroxide (II) under the reaction conditions are mixtures of hydrogen peroxide and cyclohexanone. Examples of suitable forms in which the hydrogen peroxide may be fed to the reaction are aqueous solutions, which may vary in strength over a wide range and examples of suiatble concentrations are those in the range 20–40% by weight of hydrogen peroxide, for example solutions containing about 30% of hydrogen peroxide by weight. However, hydrogen peroxide solutions containing as little as 2% by weight of hydrogen peroxide may be used.

When using mixtures of hydrogen peroxide and cyclohexanone, hydrogen peroxide stabilizers for example sodium ethylene diamine tetra-acetate (E.D.T.A.) may be added to the reaction mixture.

Ammonia which is reacted with peroxide (II) or substances giving peroxide (II) under the reaction conditions may be fed to the reaction in the gaseous or in the liquid phase, e.g. in the form of an aqueous solution. When ammonia solutions are used, the concentration is not very critical and an example of a solution which may be used is the commercially available solution having a relative density of 0.880. It is preferable to use an excess which need only be a slight excess of ammonia, over the stoichiometric quantity, i.e. a molar ratio of ammonia to peroxide (II) slightly greater than 1:1. Where substances giving peroxide (II) under the reaction conditions are used, the stoichiometric quantity of ammonia is the number of moles of ammonia which equals the number of moles of peroxide (II), which could notionally be formed. Thus 2 moles of cyclohexanone and 1 mole of hydrogen peroxide can give 1 mole of peroxide (II) and with these quantities of cyclohexanone and hydrogen peroxide the stoichiometric quantity of ammonia is 1 mole.

When the hydrogen peroxide, cyclohexanone and ammonia are used, the molar ratios in which they are brought into contact may be the stoichiometric one, i.e. 1:2:1 or may vary widely from the stoichiometric ratio. Thus the conversion of cyclohexanone may be increased by using an excess of hydrogen peroxide but this is often undesirable as the excess hydrogen peroxide tends to be decomposed and lost. Excess cyclohexanone and ammonia, however can be recovered and as indicated above the use of at least a slight excess of ammonia is preferred. The use of excess cyclohexanone is also often beneficial. Examples of molar ratios of cyclohexanone to hydrogen peroxide which may be used are 5:1 to 1.3:1.

The peroxide (II) or substances giving peroxide (II) under the reaction conditions may be reacted with the ammonia by mixing the reactants together, optionally in a solvent for peroxide (II) or the substances giving peroxide (II) under the reaction conditions, e.g. lower alkanols, such as ethanol or methanol. Where the reaction mixture contains appreciable amounts of water as a result of the use of aqueous hydrogen peroxide and/or aqueous ammonia, a substance which is a solvent for the peroxide (II), or for non-water soluble substances giving peroxide (II) under the reaction conditions (e.g. the cyclohexanone constituent of the cyclohexanone/hydrogen peroxide mixture), and which is miscible with, or highly soluble in, water may be used. However it is not necessary to carry out the reaction with peroxide (II) in solution, and satisfactory results may be obtained by reacting ammonia with a suspension of peroxide (II). Similarly it is not necessary to use a water-miscible solvent for cyclohexanone where cyclohexanone is a reactant. It is preferred to avoid the presence of very large quantities of water in the reaction mixture but the presence of some water may be desirable.

The concentration of the ammonium chloride in the reaction mixture may vary over a moderately wide range, for example from 2 to 20% by weight, in particular 2 to 10% by weight.

The reaction of peroxide (II), or substances giving peroxide (II) under reaction conditions, with ammonia may be carried out over a moderately wide range of temperatures. The use of high temperatures is preferably avoided as this may lead to some decomposition of peroxy compounds, while at very low temperatures the reaction is inconveniently slow. An example of a suitable range of temperatures is the range 0 to 50° C. and in particular temperatures in the range 20 to 40° C.

The reaction time will depend on the temperatures used, being longer at lower temperatures. At temperatures of 30 to 50° C. quite high yields are obtained after about 2 hours.

Efficient mixing of the reactants is advantageous. The peroxyamine (I) may be recovered by any suitable method. The best method of recovering peroxyamine (I) may depend on the way in which the reaction is carried out. If the reaction is carried out using aqueous ammonia, hydrogen peroxide, and cyclohexanone at temperatures below about 20°, then initially 1,1'-dihydroxydicyclohexyl peroxide (II) separates out as a solid, but towards the end of the reaction period an oil layer forms at the bottom of the reaction vessel. This layer contains the peroxyamine (I) together with some unreacted cyclohexanone. This crude peroxyamine may be separated as an oil, filtered off as a solid precipitate after chilling to −10° C. or extracted into a suitable water-immiscible organic solvent e.g. ether, chloroform, light petroleum or benzene which is subsequently removed by distillation.

The crude peroxyamine may be purified by any convenient means, for example the lower boiling impurities may be removed by distillation and the peroxyamine then distilled under sub-atmospheric pressure or the crude peroxyamine may be dissolved in a suitable solvent, concentrated and crystallised preferably at about 0° C. When the crude peroxyamine is extracted from the reaction mixture into a solvent this solution may be concentrated and chilled to give pure peroxyamine crystals. Alternatively the crude peroxyamine may be dissolved in a water miscible solvent, e.g. ethanol and the resulting solution may be run into a large volume of water causing the peroxide (I) to be precipitated as a solid which can be filtered off.

For some uses the crude peroxyamine oil may be used as such; alternatively it may only be necessary to dry the crude peroxyamine oil by contact with a drying agent or by removing the water by vacuum distillation. If the ammonia gas is passed into a mixture of cyclohexanone, ammonium chloride and hydrogen peroxide which may also contain a "cyclohexanone solubilizer," e.g. methanol, and a hydrogen peroxide stabilizer, e.g. sodium E.D.T.A., at a temperature above room temperature, e.g. 30 to 40° C., for several hours and the resulting mixture is allowed to stand and cool for e.g. 10 to 15 hours, then a precipitate of crystalline peroxide (I) may be obtained which may be filtered off without further separation. The yield of peroxide (I) from this method using additional gaseous ammonia was higher than that obtained using aqueous ammonia alone.

The invention will now be illustrated by reference to the following examples in which all temperatures are in degrees Celsius.

EXAMPLES

A series of tests was carried out in which cyclohexanone, 0.880 ammonia solution (an aqueous solution of ammonia having a density of 0.880 gram per millilitre), the sodium salt of ethylene diamine tetra-acetic acid, methanol (when used), and accelerator or catalyst (when used) were vigorously stirred together and an aqueous solution containing 28% by weight hydrogen peroxide added gradually, keeping the temperature below 10°. 1,1'-dihydroxydicyclohexyl peroxide separated out as a solid over 5–30 minutes. The temperature was raised to 40° and ammonia gas passed into the solution. After two hours the yield of peroxyamine (I) was determined by extraction of the crude product with petroleum ether followed by the removal of the ether and analysis of the crystals obtained.

The quantities of the reactants and solvents used and the yield of peroxyamine (I) based on cyclohexanone are recorded in the accompanying table. This table shows that ammonium salts or chloride salts per se do not give any marked improvement and may even depress the yield of peroxyamine (I). High yields are obtained only with the specific compound ammonium chloride.

I claim:

1. The process for producing 1,1'-peroxydicyclohexylamine which comprises reacting at a temperature of from 0°–50° C., 1,1'-dihydroxydicyclohexyl peroxide, or cyclohexanone and hydrogen peroxide with ammonia in the presence of ammonium chloride.

2. A process according to claim 1 wherein the hydrogen peroxide is fed to the reaction in the form of an aqueous solution.

3. The process according to claim 2 wherein the concentration of hydrogen peroxide in the aqueous solution is in the range 20 to 40% by weight.

4. The process according to claim 1 wherein the concentration of the ammonium chloride in the reaction mixture is in the range 1 to 20% by weight.

5. The process according to claim 4 wherein the concentration of ammonium chloride is in the range 2 to 10% by weight.

6. The process according to claim 1 wherein ammonia is fed to the reaction as an aqueous solution.

7. The process according to claim 1 wherein ammonia is fed to the reaction as a gas.

8. The process according to claim 1 where a quantity of ammonia in excess of the stoichiometric quantity is brought into contact with 1,1'-dihydroxydicyclohexyl peroxide or cyclohexanone and hydrogen peroxide.

9. The process according to claim 1 wherein cyclohexanone and hydrogen peroxide are brought into contact with ammonia in a molar ratio of cyclohexanone to hydrogen peroxide in the range 5:1 to 1.3:1.

10. The process according to claim 4 wherein the 1,1'-dihydroxydicyclohexyl peroxide or substances giving 1,1'-dihydroxydicyclohexyl peroxide under the reaction conditions are reacted with ammonia by mixing the reactants together in the presence of a solvent for the 1,1'-dihydroxydicyclohexyl peroxide for the cyclohexanone and hydrogen peroxide.

11. The process according to claim 10 wherein the solvent is a lower alkanol.

12. The process according to claim 11 wherein the lower alkanol is ethanol or methanol.

13. The process according to claim 4 wherein the 1,1'-dihydroxydicyclohexyl peroxide or cyclohexanone and hydrogen peroxide is brought into contact with ammonia and ammonium chloride at temperatures in the range 0 to 50° C.

14. The process according to claim 13 wherein the temperature is in the range 20 to 40° C.

TABLE 1

| Run No. | Cyclohexanone (g.) | 28% by wt. hydrogen peroxide (ml.) | 0.880 ammonia solution (ml.) | Methanol (ml.) | Sodium salt of ethylene diamine tetra acetic acid (g.) | Accelerator | Yield of 1,1'-peroxydicyclohexylamine as a percentage of theoretical yield based on cyclohexanone |
|---|---|---|---|---|---|---|---|
| 1 | 450 | 279 | 350 | 225 | 5 | None | 73.1 |
| 2 | 450 | 279 | 350 | None | 5 | None | 75.4 |
| 3 | 450 | 279 | 350 | None | 5 | Ammonium chloride, 48.5 g | 81.3 |
| 4 | 450 | 279 | 350 | None | 5 | Sodium nitrate, 48.5 g | 75.8 |
| 5 | 450 | 279 | 350 | 225 | 5 | Sodium chloride, 48.5 g | 76.5 |
| 6 | 270 | 156 | 210 | 135 | 3 | Sodium sulphate, 29.0 g | 74.5 |
| 7 | 360 | 223 | 280 | 180 | 4 | Ammonium sulphate, 38.7 g | 53.0 |
| 8 | 450 | 279 | 350 | 225 | 5 | Ammonium carbonate, 48.5 g | 60.0 |

References Cited

UNITED STATES PATENTS 3,252,979  5/1966  Oswald _____ 260—563X

OTHER REFERENCES

Derwent: Belgian Patent Report No. 12/68, Abstract of Belgian Patent 704,214 of Mar. 22, 1968.

ALEX MAZEL, Primary Examiner

R. V. RUSH, Assistant Examiner